(12) United States Patent
Fujimoto (10) Patent No.: US 7,869,695 B2
(45) Date of Patent: Jan. 11, 2011

(54) OPTICAL DISC APPARATUS

(75) Inventor: Shojiro Fujimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1156 days.

(21) Appl. No.: 11/518,946

(22) Filed: Sep. 12, 2006

(65) Prior Publication Data
US 2007/0058935 A1   Mar. 15, 2007

(30) Foreign Application Priority Data
Sep. 13, 2005   (JP) ............................. 2005-265402

(51) Int. Cl.
*H04N 5/00* (2006.01)
*H04N 5/76* (2006.01)
(52) U.S. Cl. ........................................ 386/125; 386/96
(58) Field of Classification Search .................. 386/1, 386/45–46, 95–96, 125–126
See application file for complete search history.

(56) References Cited
U.S. PATENT DOCUMENTS
7,684,678 B2 *  3/2010  Ishiguchi ...................... 386/96
2001/0042083 A1 * 11/2001  Saito et al. .................. 707/517

FOREIGN PATENT DOCUMENTS
| JP | 55-27919 A | 2/1980 |
| JP | 3-54785 A | 3/1991 |
| JP | 4-271422 A | 9/1992 |
| JP | B-2615618 | 3/1997 |
| JP | B-3537992 | 3/2004 |
| JP | A-2005-063610 | 3/2005 |

* cited by examiner

*Primary Examiner*—Thai Tran
*Assistant Examiner*—Nigar Chowdhury
(74) *Attorney, Agent, or Firm*—Morgan Lewis & Bockius LLP (57) ABSTRACT

To improve operability of figure key input in a title search, a chapter search, a track search, and a time search mode in an optical disc apparatus, for example, the quantity number of titles and the quantity number of digits thereof are detected from an optical disc. When a figure for title search is inputted, if this figure exceeds a figure included in the ten's digit of the quantity number of titles, this figure is considered as a figure in the one's digit for search. If the figure for search is equal to or smaller than the figure in the ten's digit of the quantity number of titles, the figure inputted for search is registered as a figure in the ten's digit. Subsequently, if the figure for search is smaller than the figure in the ten's digit of the quantity number of titles, a figure in the one's digit for search within a range from 0 to 9 is inputted and registered. If the figure for search is equal to the figure in the ten's digit of the quantity number of titles, a figure inputted in the one's digit for search, which is limited to a figure equal to or smaller than the figure in the one's digit of the quantity number of titles, is inputted and registered.

8 Claims, 4 Drawing Sheets

OPTICAL DISC APPARATUS

This application is based on Japanese Patent Application No. 2005-265402 filed on Sep. 13, 2005, the contents of which are hereby incorporated by reference.

BACKGROUND OF THE INVENTION

1. Field of the Invention

The present invention relates to an optical disc apparatus that performs reproduction, or recording and reproduction of information recorded on an optical disc, and more specifically, to figure input processing before executing title search, chapter search, track search, time search, and the like.

2. Description of Related Arts

As apparatuses that reproduce information recorded on an optical disc, such as a DVD(Digital Versatile Disk), CD (Compact Disk), or the like, optical disc apparatuses, such as DVD players, DVD recorders, or the like, have been widespread. To quickly find desired information from a DVD for reproduction, title search, chapter search, and time search are used. To quickly find desired information from a CD for reproduction, track search and time search are used.

For example, in reproduction from the DVD, before executing title search, chapter search, or time search, the DVD from which reproduction is to be performed is first loaded in the optical disc apparatus. Then, the menu key on a remote controller is held down, and, from among menu items on the menu screen displayed on a display apparatus, "title search", "chapter search", or "time search" is selected by holding down a Direction key on the remote controller and then determined by holding down a Determine key thereon, whereby the optical disc apparatus is set in any one of the modes, title search, chapter search, and time search.

In reproduction from the CD, before executing track search or time search, the CD from which reproduction is to be performed is first loaded in the optical disc apparatus. Then, the menu key on the remote controller is held down, and, from among the menu items on the menu screen displayed on the display apparatus, "track search" or "time search" is selected by holding down the Direction key on the remote controller and then determined by holding down the Determine key thereon, whereby the optical disc apparatus is set in either of the modes, track search or time search.

In the conventional optical disc apparatus, each of the search modes is set in a manner as described above. However, as a figure inputted upon this setting, any figure can be inputted, because a searchable figure is not taken into consideration during this figure setting. Thus, immediately before apparatus proceeds to search operation, the display apparatus, if there is any non-searchable figure, displays notification that search cannot be performed. In such a case, figure input operation needs to be performed again from the beginning, thus posing a problem of degraded operability of search function.

For example, in a case where, title search is performed on a DVD where only 12 titles are recorded, if a figure "1" is inputted at the first input operation, this figure "1" is registered as a figure in the ten's digit. However, if a figure "3" is inputted at the first input operation, the display device displays that title search cannot be performed. In a case where, after a figure "1" is inputted at the first input operation and registered as a figure in the ten's digit, for example, a figure "5" is inputted as a figure in the one's digit, this indicates the fifteenth title. In this case, the display device displays that title search cannot be performed, so that the figure input operation needs to be performed again from the beginning, thus posing a problem of degraded operability of search function.

JP-A-2005-63610 discloses a time search apparatus which, when time is inputted by input means, compares this inputted time with the total time recorded on the disc and, if the inputted time exceeds the total time, invalidates the inputted figures and then displays, in the corresponding digits, i.e., hour, minute, and second, on the display part, the upper limit values that can be inputted within the total time. Since the input figures are invalidated if the inputted time exceeds the total time, the input operation needs to be performed again from the beginning, thus resulting in degraded operability of search function. Moreover, in this conventional art, title search, chapter search, and track search are not disclosed.

JP-B-3537992 discloses a disc reproduction apparatus that performs reproduction from an optical disc, such as a CD or a MD. For example, an arbitrary position corresponding to a figure in decimal place is searched where one worth of disc tracks is sized as 1 so as to achieve reproduction. However, this publication does not disclose setting of figures inputted for title search, chapter search, track search, and time search, and operation related thereto.

JP-B-2615618 discloses an art that achieves easy settings for reproducing a program by recognizing the state of a display element illuminated, but does not disclose setting of figures inputted for title search, chapter search, track search, and time search.

SUMMARY OF THE INVENTION

To solve the problem described above, the invention has been made, and it is an object of the invention to provide an optical disc apparatus capable of improving operability of figure key inputting in title search, chapter search, track search, and time search.

To achieve the object described above, one aspect of the invention provides an optical disc apparatus which has at least one of title search, chapter search, and track search modes, and which performs reproduction, or reproduction and recording of information recorded on an optical disc. The optical disc apparatus includes a system controller which: when the optical disc apparatus is set at any of the modes, detects from the optical disc, as a maximum figure for search, a quantity number of recorded titles in a case of the title search mode, a quantity number of recorded chapters in a case of the chapter search mode, and a quantity number of recorded tracks in a case of the track search mode, and also calculates a quantity number of digits in the maximum figure for search; if the quantity number of digits in the maximum figure for search is two and a figure inputted for search to specify a sequential number of title, chapter, or track to be searched is smaller than a figure included in a ten's digit of the maximum figure for search, registers the figure inputted for search as a figure in a ten's digit, and also registers a figure subsequently inputted for search as a figure in an one's digit; if the quantity number of digits in the maximum figure for search is two and the figure inputted for search is equal to the figure included in the ten's digit of the maximum figure for search, registers the figure inputted for search as the figure in the ten's digit, and if the figure subsequently inputted for search is equal to or smaller than a figure included in an one's digit of the maximum figure for search, registers the figure inputted for search as the figure in the one's digit; if the quantity number of digits in the maximum figure for search is two and the figure inputted for search exceeds the figure included in the ten's digit of the maximum figure for search, registers the figure inputted for search as the figure in the one's digit; if the quantity number of digits in the maximum figure for search is one and the figure inputted for search is equal to or smaller than the figure included in the one's digit of the maximum figure for search, registers the figure inputted for search as the figure in the one's digit; and causes the title search, the chapter search, or the track search to be performed based on the registered figure for search.

According to this configuration, input of figures exceeding the maximum figures of the quantity number of titles, chapters, and tracks (maximum figure for search) can be restricted, thereby, improving operability of figure key input in title search, chapter search, and track search and also leading to prevention of erroneous operation and the like.

Another aspect of the invention provides an optical disc apparatus which includes a time search mode and which performs reproduction, or reproduction and recording of information recorded on an optical disc. The optical disc apparatus includes a system controller which: when the time search mode is set, detects from the optical disc a maximum time for time search; if a figure inputted in an hour digit for time search is equal to a figure included in an hour digit of the maximum time for time search, registers the figure inputted for time search as a figure in hour digit for search, then registers a figure inputted in a minute digit for time search, input of which figure up to a figure in a minute digit of the maximum time for time search is permitted, as a figure in a minute digit for search, and then registers a figure inputted in a second digit for time search, input of which figure up to a figure in a second digit of the maximum time for time search is permitted, as a figure in a second digit for search; if the figure inputted in the hour digit for time search is smaller than the figure included in the hour digit of the maximum time for time search, registers figures inputted in a minute and a second digit for time search, input of which figures within a range from 0 to 59 is permitted, as figures in a minute and a second digit for search; and causes the time search to be performed based on the figures registered for time search.

According to this configuration, a system controller is provided which makes correct judgment without wasting inputs made. Thus, even in the time search in which figures to be inputted are related to one another, inputting of a non-searchable figure is prohibited, thereby improving operability of figure key input in the time search and also leading to prevention of erroneous operation and the like.

DETAILED DESCRIPTION OF PREFERRED EMBODIMENTS

Figure 1:
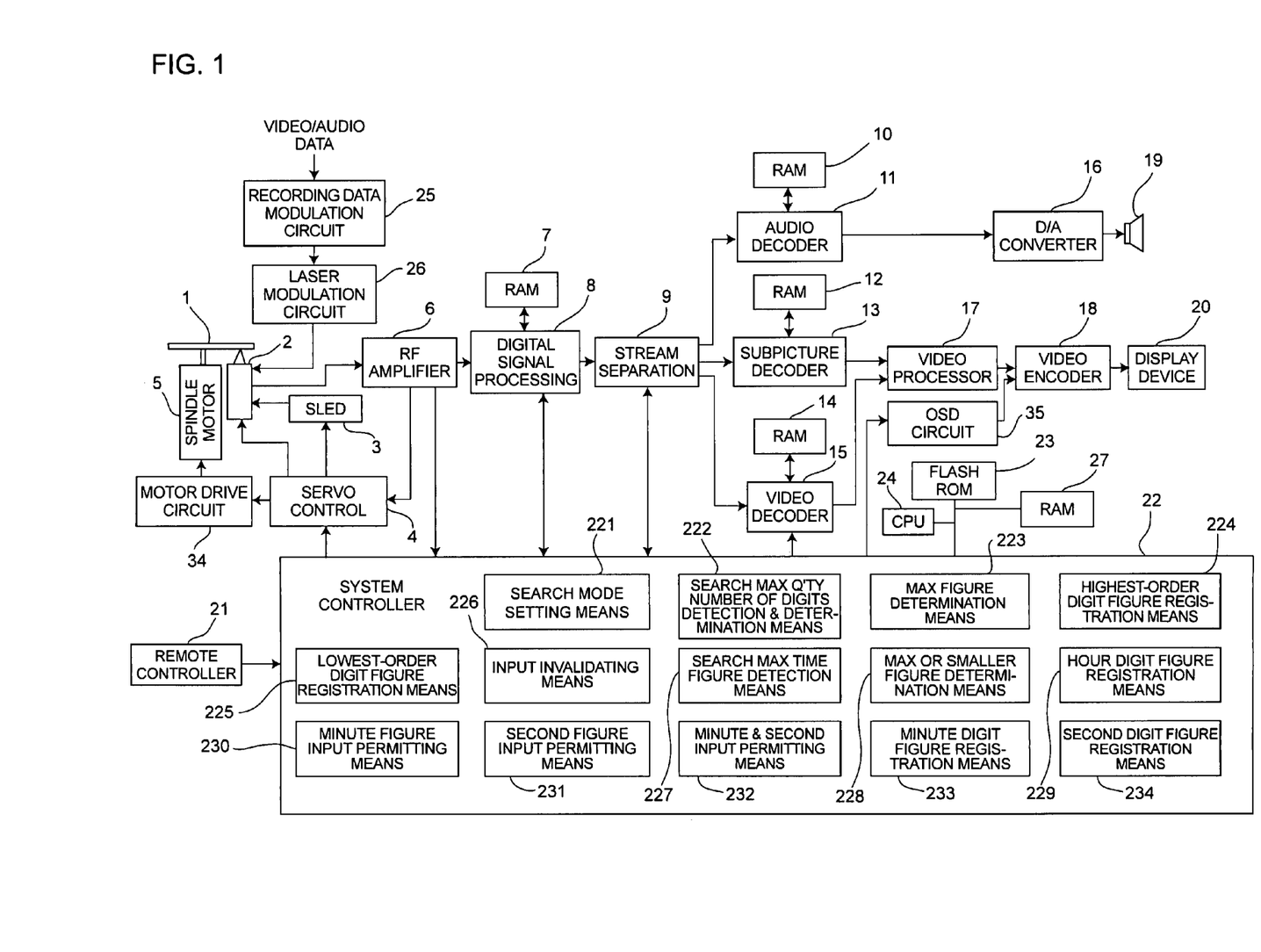
FIG. 1 is a block diagram showing the configuration of an optical disc apparatus according to one embodiment of the invention.

Hereinafter, the embodiment of the present invention will be described, with reference to the accompanying drawings. FIG. 1 is a block diagram showing the configuration of an optical disc apparatus according to one embodiment of the invention. Here, the configuration of an optical disc apparatus, such as a DVD recorder or the like, will be described. However, it is needless to say that title search, chapter search, track search, time search, and the like of the invention are similarly applicable to an optical disc apparatus, such as a DVD player or the like.

This optical disc apparatus is provided with: a spindle motor 5 which rotates an optical disc 1; an optical pickup 2 which emits a laser beam for performing information recording/reproduction on/from the optical disc 1 and also which receives a reflecting beam from the optical disc 1; a sled 3 for moving this optical pickup 2 in the radial direction of the optical disc 1; and a servo control part 4 which, in accordance with instructions from a system controller 22, drives the spindle motor 5 and the sled 3 via a motor drive circuit 34 and operates an objective lens (not shown) built in the optical pickup 2 to thereby perform control of moving the focal position of a laser beam perpendicularly and horizontally with respect to the recording surface of the optical disc 1.

This optical disc apparatus is also provided with: an RF amplifier 6 which amplifies an RF signal as a signal read from the optical pickup 2 upon reproduction from the optical disc 1; a digital signal processing part 8 which, after converting the RF signal outputted from this RF amplifier 6 into digital data, performs signal demodulation processing and ECC error correction processing in accordance with the data format of the optical disc 1 to thereby store the generated data into a RAM 7; and a stream separation part 9 which separates audio data, subpicture data, and video data from among a data stream outputted from the digital signal processing part 8 in accordance with instructions from the system controller 22.

This optical disc apparatus is also provided with: an audio decoder 11 which performs predetermined decoding processing upon receiving the audio data outputted from the stream separation part 9; a RAM 10 which temporarily stores data for performing the decoding processing in the audio decoder 11; a subpicture decoder 13 which performs predetermined decoding processing upon receiving the subpicture data outputted from the stream separation part 9; a RAM 12 which temporarily stores data for performing the decoding processing in the subpicture decoder 13; a video decoder 15 which performs predetermined decoding processing upon receiving the video data outputted from the stream separation part 9; and a RAM 14 which temporarily stores data for performing the decoding processing in the video the decoder 15.

This optical disc apparatus is also provided with: a video processor 17 which, in accordance with instructions from the system controller 22, synthesizes data outputted from the video decoder 15 and data outputted from the subpicture decoder 13; an OSD circuit 35 which generates data on a search selection screen related to title search, chapter search, track search, or time search; a video encoder 18 which converts the synthesized data outputted from the video processor 17, the search selection screen data outputted from the OSD circuit 35, or the like into a display video signal and then has the image displayed on a display device 20; and a D/A converter 16 which converts the data outputted from the audio decoder 11 into an analog audio signal and supplies it to, for example, a speaker 19.

This optical apparatus is also provided with: a remote controller 21 having various operation keys for providing instructions to the system controller 22 by an infrared signal, including a reproduction key for instructing reproduction, a recording key for instructing recording, a stop key for instructing stopping reproduction or recording, a power key, and the like; and the system controller 22 that controls the entire apparatus.

This optical disc apparatus is also provided with: a flash ROM 23 which stores programs and data for controlling each component of the apparatus and controlling the entire apparatus; a CPU 24 which performs operations in accordance with the data and programs stored in this flash ROM 23 and controls the system controller 22; and a RAM 27 which temporarily stores data required for processing by the CPU 24.

This optical disc apparatus is also provided with: a recording data modulation circuit 25 which modulates video audio data transmitted from a television receiver, a personal computer, or the like, all not shown, so as to record it to the optical disc 1; and a laser modulation circuit 26 which modulates a laser beam emitted from the optical pickup 2 based on the data modulated by this recording data modulation circuit 25.

The system controller 22, as a feature of this embodiment, is provided with: search mode setting means 221; maximum quantity number of digits detection and determination means 222; maximum figure determination means 223; highest-order digit figure registration means 224 ; lower-order digit figure registration means 225; and input invalidating means 226. The search mode setting means 221, in accordance with search operation performed by the user, sets any one of title search, chapter search, and time search modes when the optical disc 1 is a DVD, or sets either of time search and track search modes when the optical disc 1 is a CD. The maximum quantity number of digits detection and determination means 222, when any one of title search, chapter search, and track search modes is set by the search mode setting means 221, detects from the DVD the quantity number of DVD titles or chapters or tracks (maximum figure for search) and then detects and determines the maximum quantity number of digits in this detected quantity number. The maximum figure determination means 223, upon search, compares for determination the maximum figure in each digit of the detected quantity number with a figure inputted for search. If there is no problem with the figure inputted for search, in accordance with the digit to which this inputted figure corresponds, the highest-order digit figure registration means 224 registers this figure as a figure in the highest-order digit, or the lower-order digit figure registration means 225 registers this figure as a figure in a digit lower than the highest-order digit. The input invalidating means 226, under a predetermined condition and when the figure inputted in the one's digit exceeds the maximum figure in the one's digit of the aforementioned quantity number, invalidates the inputted figure.

Moreover, the system controller 22 is provided with: search maximum time detection means 227; maximum or smaller figure determination means 228; hour digit figure registration means 229; minute figure input permitting means 230; second figure input permitting means 231; minute and second figures input permitting means 232; minute digit figure registration means 233; and second digit figure registration means 234. The search maximum time detection means 227, when the time search mode is set by the search mode setting means 221, detects the maximum time recorded in the DVD or the like. The maximum or smaller figure determination means 228 determines whether the figure inputted in the hour digit for search is equal to or smaller than the maximum figure included in the hour digit of the detected maximum time. The hour digit figure registration means 229, if it is determined that the figure inputted in the hour digit for search is equal to the maximum figure in this manner, registers the figure inputted for search as a figure in the hour digit. The minute figure input permitting means 230, if the aforementioned figure inputted for search is registered as the figure in the hour digit in this manner, permits a figure up to the maximum figure included in the minute digit of the detected maximum time to be inputted as the figure inputted in the minute digit for search. The second figure input permitting means 231, if the aforementioned figure inputted for search is registered as the figure in the minute digit in this manner, permits a figure up to the maximum figure included in the second digit of the detected maximum time to be inputted as the figure inputted in the second digit for search. The minute and second figures input permitting means 232, if it is determined by the maximum or smaller figure determination means 228 that the figure inputted in the hour digit for search is smaller than the maximum figure included in the hour digit of the detected maximum time, permits figures from 0 to 59 to be respectively inputted as the figures inputted in the minute and second digits for search. The minute digit figure registration means 233 registers the figure in the minute digit inputted within the range permitted by the minute figure input permitting means 230 or the minute and second figures input permitting means 232. The second digit figure registration means 234 registers the figure in the second digit inputted within the range permitted by the second figure input permitting means 231 or the minute and second figures input permitting means 232.

Figure 2:
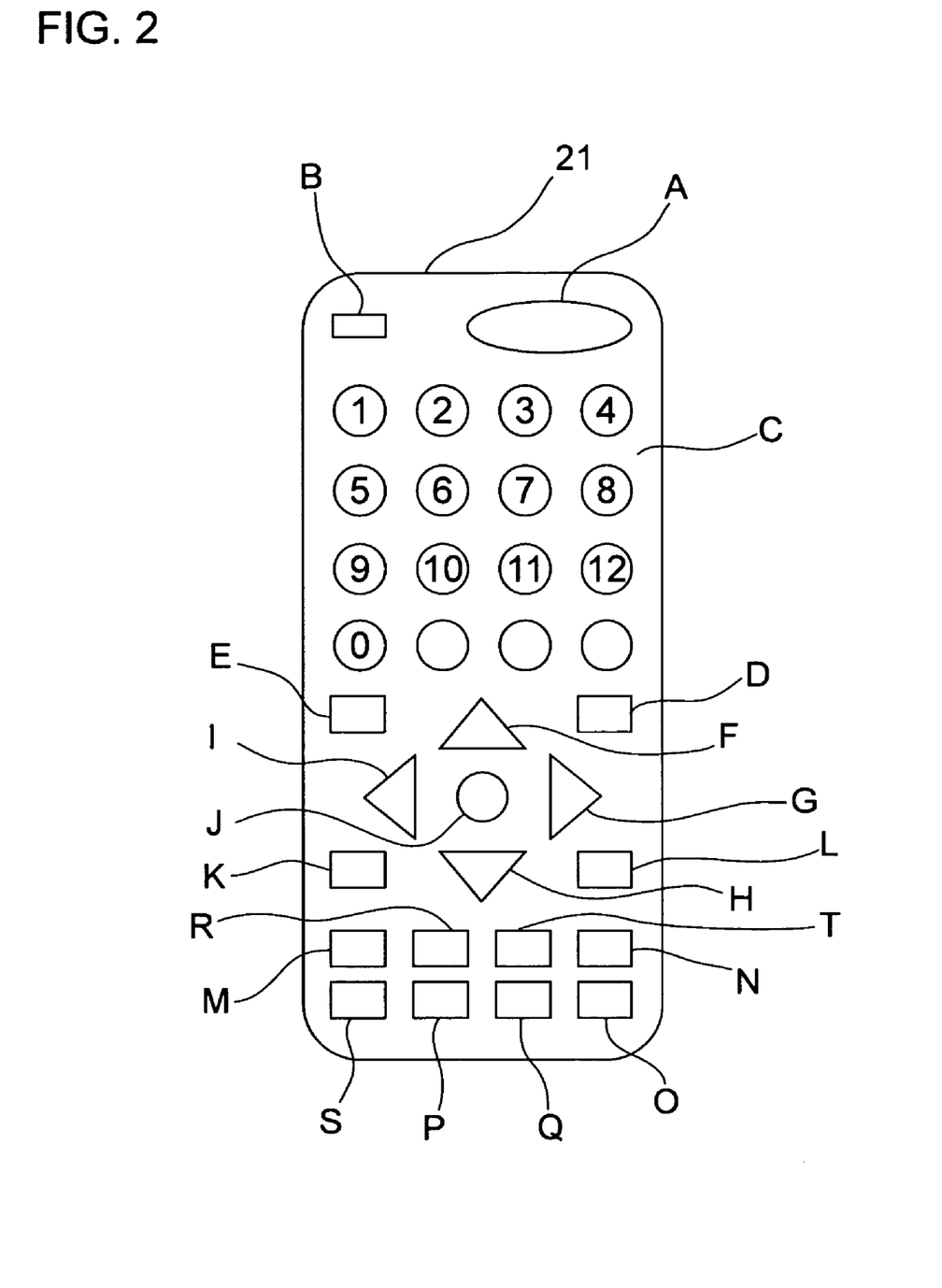
FIG. 2 is a plan view showing one example of key arrangement of a remote controller that operates the optical disc apparatus.

FIG. 2 is a plan view showing one example of key arrangement of a remote controller that operates the optical disc apparatus of this embodiment. In FIG. 2, the remote controller 21 is provided with operation keys including: a Power key A, a Tray open/close key B, a plurality of Figure keys C, a Search key D, a Clear key E, an Up direction key F, a Right direction key G, a Down direction key H, a Left direction key I, a Determine key J, a Replay key K, a Record key L, a Fast reverse key M, a Fast forward key N, a Stop key O, a Reverse direction skip key P, a Forward direction skip key Q, a Slow replay key R, a Temporary stop key S, a Menu key T, and the like. The arrangement of these operation keys is just one example, and thus not limited thereto. The remote controller 21 further has operation keys other than those described above, although they are omitted from the drawing.

Figure 3:
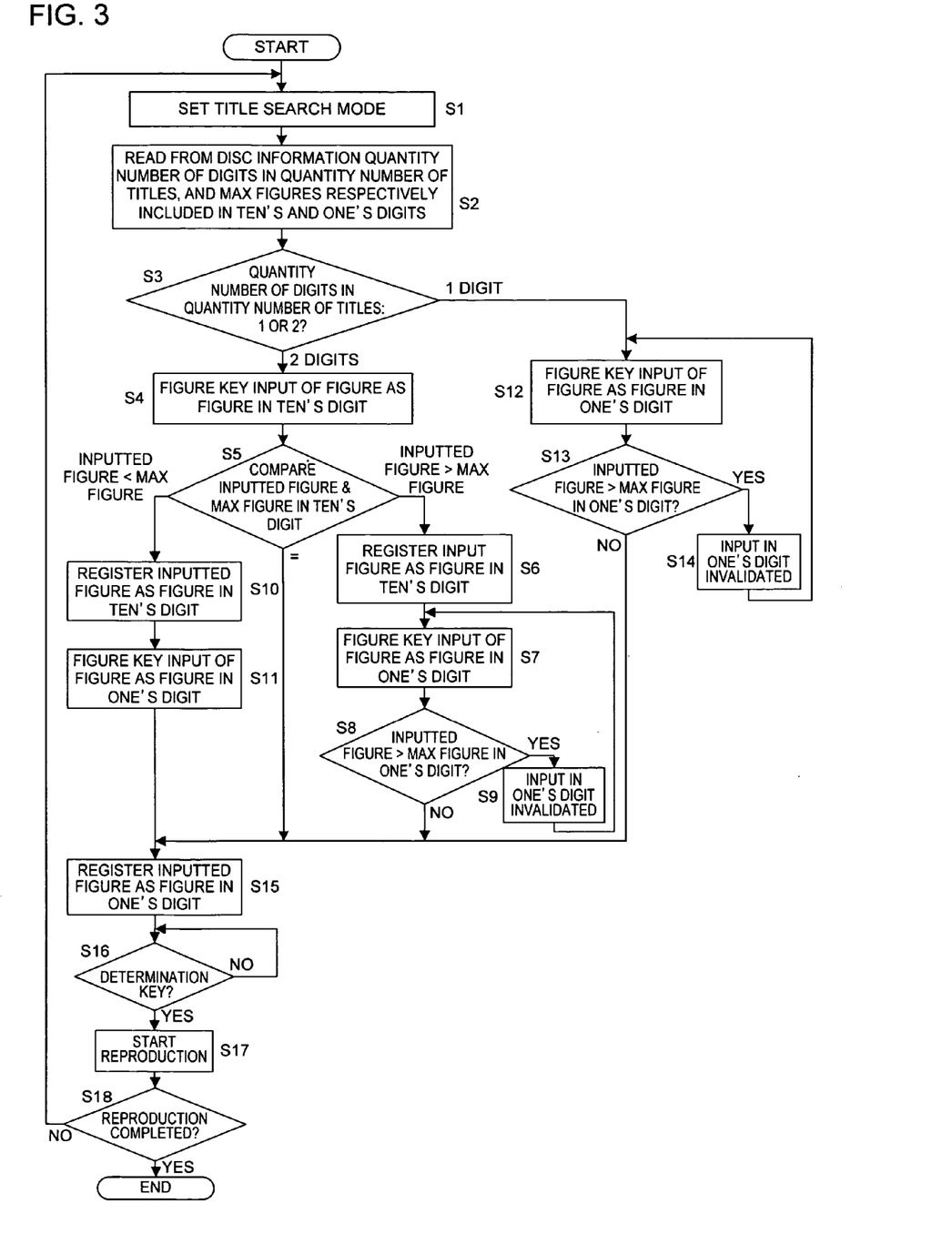
FIG. 3 is a flowchart for explaining figure input processing when the optical disc apparatus performs title search where an optical disc is a DVD.

FIG. 3 is a flowchart for explaining figure input processing when the optical disc is a DVD and title search is performed in this embodiment. Referring to this flowchart and FIGS. 1 and 2, the figure input processing will be described in detail using an example of title search mode of the DVD.

First, the DVD from which reproduction is to be performed is loaded in the optical disc apparatus. Then, the Menu key T on the remote controller 21 is held down, and, from among menu items on the menu screen displayed on a display device 20, "Title search", is selected by holding down the Direction key (Up direction key F, Right direction key C, Down direction key H, Left direction key I) on the remote controller 21 and then determined by holding down the Determine key J, whereby the search mode setting means 221 of the system controller 22 sets the apparatus at the title search mode (step S1).

Here, to set the title search mode, "Title search" is selected from among the menu items on the menu screen. Alternatively, during reproduction, the title search mode can be set by holding down the Search key D on the remote controller 21 and then selecting "Title search". Still alternatively, during reproduction, the title search mode can be set by holding down the Temporary stop key S on the remote controller 21 to temporarily stop the reproduction, holding down the Search key D, and then selecting "Title search" (step S1).

When the title search mode has been set in this manner, the maximum quantity number of digits detection and determination means 222 of the system controller 22 detects, from the disc information, the maximum quantity number of digits in the quantity number of titles (maximum figure for search) and a figure included in a respective digit of the detected maximum quantity number (step S2). This example will be described, referring to a case where the quantity number of titles in the DVD is "37" in double digits with the maximum figure in the ten's digit being "3" and the maximum figure in the one's digit being "7", and where the 35th title is searched from among these 37 titles for reproduction.

In this example, the quantity number of titles has 2 digits; thus, the maximum quantity number of digits detection and determination means 222 proceeds to step S4 (step S3). Then, for title search, as the first figure input, a FIG. 3 key of the figure key C on the remote controller 21 is held down (step S4). Consequently, the maximum figure determination means 223 compares for determination this inputted figure "3" with the maximum figure "3" in the ten's digit in the previously detected quantity number of titles, and then proceeds to the following processing depending on whether the inputted figure is smaller than the maximum figure, or the inputted figure is larger than the maximum figure, or the inputted figure is equal to the maximum figure (step S5).

In this example, it is determined that the inputted figure is equal to the maximum figure; thus, the inputted figure is registered as the figure in the ten's digit by the highest-order digit figure registration means 224 (step S6). Next, a FIG. 5 key of the figure key C on the remote controller 21 is held down as a lower-order digit figure to input the second figure "5" into the apparatus (step S7). Consequently, the maximum figure determination means 223 compares for detection this inputted figure "5" with the maximum figure "7" in the one's digit of the previously detected quantity number of titles (step S8). If the inputted figure exceeds the maximum figure in the one's digit, it is judged that titles in quantity number larger than the quantity number of titles are about to be searched, and thus the input is invalidated by the input invalidating means 226 until the inputted figure becomes equal to or smaller than the maximum figure in the one's digit (step S9). That is, input for search for over the quantity number of titles cannot be performed.

In this example, the inputted figure "5" does not exceed the maximum figure "7" in the one's digit in step S8, and thus registered as a figure in the one's digit for search by the lower-order digit figure registration means 225 (step S15). All the figures in the respective digits are inputted in this manner, and when the Determine key J on the remote controller 21 is held down (step S16), reproduction of the 35th title starts in accordance with the registered figure inputted for search (step S17). The reproduction is completed (step S18) whereby this processing ends. If title search is performed again during the reproduction, processing from steps S1 to S18 is executed.

On the other hand, if it is determined in step S5 that the inputted figure is smaller than the maximum figure, in a case, for example, where the figure inputted for search is any of "01" to "29", the inputted figure "0", "1", or "2" is registered as a figure in the ten's digit for search by the maximum digit figure registration means 224 (step S19). Subsequently, a figure in the one's digit for search is inputted (step S11), and any of the figures "0" to "9" is admitted as a figure in the one's digit for search and thus registered as the figure in the one's digit for search by the lower-order figure registration means 225 (step S15).

For example, if the quantity number of titles is "37", search for "40" or more titles is not possible. Thus, if it is judged in step S5 that the inputted figure is larger than the maximum figure, that is, if the inputted figure is "4" or more, the inputted figure is treated as a figure in the one's digit for title search (step S15).

The processing described above refers to the case where the quantity number of titles has two digits. In a case where the quantity number of titles has one digit, figure key input of a figure in the one's digit is performed for search (step S12). An example where the quantity number of titles is "8" will be described below.

Any of figures "1" to "8" inputted in the one's digit is equal to or smaller than the maximum figure in the one's digit of "8" (step S13), and any of the inputted figures "1" to "8" is validated and registered as a figure in the one's digit for search by the lower-order figure registration means 225 (step S15). However, if the inputted figure exceeds the maximum figure (for example, if the inputted figure is "9" exceeding the maximum figure "8"), the input of this figure "9" is invalidated by the input invalidating means 226 (step S14). If the input is invalidated, the processing returns to step S12 to perform the same processing, and after the figure is registered as a figure in the one's digit, then the Determine key J is held down whereby reproduction of the corresponding title is performed.

This processing has been described referring to the case where the quantity number of titles has one or two digits. The same processing can be performed even in a case where the quantity number of titles has three or more digits.

As described above, for example, in a case where title search is performed on a DVD whose quantity number of titles is only 37, if any of "0" to "3" is inputted at the first figure input, this inputted figure is registered as a figure in the ten's digit, while, if the figure exceeding the aforementioned figure is inputted, the inputted figure is registered as a figure in the one's digit. This therefore can restrict input of a figure exceeding the quantity number of titles (maximum figure for search), thereby improving operability of figure key input in the title search mode and also leading to prevention of erroneous operation and the like.

The embodiment has been described above, referring to the title search mode of the DVD. For chapter search, only by replacing title search with chapter search, the same processing is executed, thus providing the same effect. Moreover, for track search on a CD, only by replacing title search with track search, the same processing is executed, thus providing the same effect.

Figure 4:
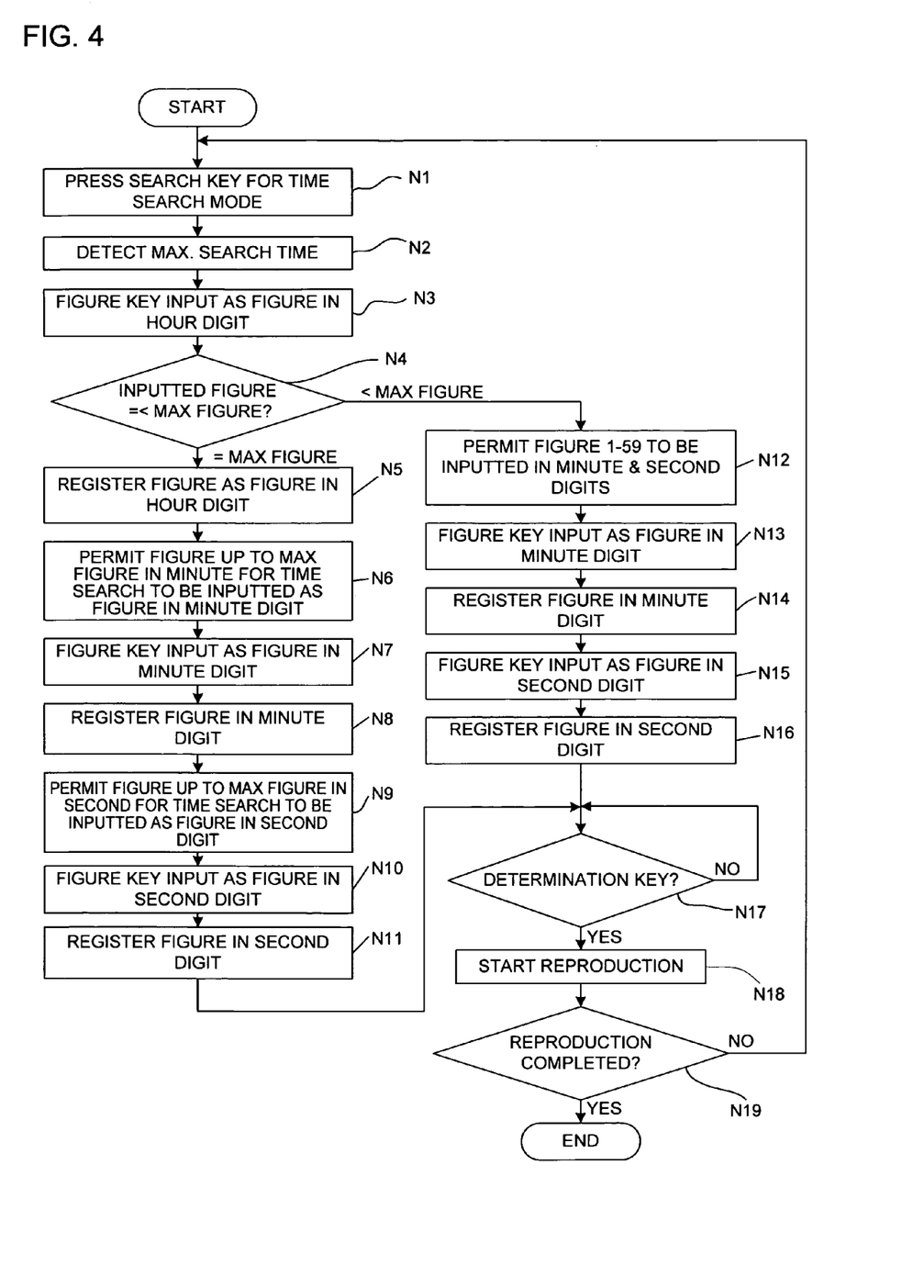
FIG. 4 is a flowchart for explaining figure input processing when the optical disc apparatus performs time search where the optical disc is a DVD.

FIG. 4 is a flowchart for explaining figure input processing when the optical disc is a DVD and time search is performed in this embodiment. Referring to this flowchart and FIGS. 1 and 2, the figure input processing at the time search mode of the DVD will be described below.

First, the DVD from which reproduction is to be performed is loaded in the optical disc apparatus. Then, the Menu key T on the remote controller 21 is held down, and, from among the menu items on the menu screen displayed on the display device 20, "Time search", is selected by holding down the Direction key (Up direction key F, Right direction key G, Down direction key H, Left direction key I) on the remote controller 21 and then determined by holding down the Determine key J, whereby the search mode setting means 221 of the system controller 22 sets the apparatus at the time search mode (step N1).

Here, to set the time search mode, "Time search" is selected from among the menu items on the menu screen. Alternatively, during reproduction, the time search mode can be set by holding down the Search key D on the remote controller 21 and then selecting "Time search". Still alternatively, during reproduction, the time search mode can be set by holding down the Temporary stop key S on the remote controller 21 to temporarily stop the reproduction, holding down the Search key D, and then selecting "Time search".

When the time search mode has been set in this manner, the search maximum time detection means 227 of the system controller 22 detects, from the disc information, the maximum search time (step N2). This example will be described, referring to a case where the search maximum time is 1 hour 23 minutes and 45 seconds.

For search, figure key input of a figure in the hour digit is performed by operating the remote controller 21 (step N3), and the maximum or smaller figure determination means 228 of the system controller 22 determines whether the first inputted figure is equal to or smaller than the maximum figure in the hour digit ("1" in this example) of the maximum time retrieved from the disc information (step N4). Note that, although not shown, if the inputted figure exceeds the maximum figure, this input may be ignored by the maximum or smaller figure determination means 228, so that it may be prompted to input a figure again or the figure may be automatically replaced with the maximum figure. If it is determined that the inputted figure is equal to the maximum figure ("1" in this example), the hour digit figure registration means 229 of the system controller 22 registers the inputted figure "1" as a figure in the hour digit (step N5).

Subsequently, the minute figure input permitting means 230 of the system controller 22 permits a figure up to the figure in the minute of the maximum time to be inputted as a figure in the minute digit of the inputted figure (step N6). In this example, since the figure in the minute of the maximum time is "23", a figure up to "23" can be inputted as a figure inputted in the minute digit. Then, key input of a figure in the minute digit of the figure inputted for search is made by operating the remote controller 21 (step N6), and the minute digit figure registration means 233 of the system controller 22 registers the figure ("23" in this case) inputted as the aforementioned figure in the minute digit (step N7).

Next, the second digit figure registration means 234 of the system controller 22 permits a figure up to the figure in the second of the maximum time to be inputted as a figure in the second digit of the inputted figure (step N8). In this example, the maximum figure in the second is "45"; thus, input of up to "45" is permitted as the figure in the second digit of the inputted figure. Then, key input of a figure in the second digit of the inputted figure is made by operating the remote controller 21 (step N9), and the second digit figure registration means 234 of the system controller 22 registers the aforementioned inputted figure ("45" in this case) as the figure in the second digit (step N10).

Subsequently, the Determine key J on the remote controller 21 is held down (step N16). In this example, reproduction from the optical disc 1 such as a DVD or a CD by time search with "1:23:45" is started (step N17). Then, reproduction ends (step N18) whereby this processing ends. If time search is performed again during reproduction, the processing from step N1 is executed.

On the other hand, if it is determined in step N4 that the inputted figure in the hour digit is smaller than the maximum figure, for example, if "0" is inputted and it is determined that the inputted figure in the hour digit is smaller than the maximum figure "1", the minute and second figures input permitting means 232 of the system controller 22 permits figures from "0 to 59" to be respectively inputted as figures inputted in the minute and second digits (step N11). Then, figure key input of a figure as a figure in the minute digit of the inputted figure is made by operating the remote controller 21 (step N12), and the minute digit figure registration means 233 of the system controller 22 registers the aforementioned inputted figure (any figure of "0 to 59" in this case) as the figure in the minute digit (step N13).

Subsequently, key input of a figure as a figure in the second digit of the inputted figure is made by operating the remote controller 21 (step N14). The second digit figure registration means 234 of the system controller 22 registers the inputted figure (any figure of "0 to 59" in this case) as the aforementioned figure in the second digit (step N15).

After the processing in step N15, the Determine key J on the remote controller 21 is held down (step N16), and, in this example, reproduction within the registered figure inputted for search, that is, within a range of "0:0–59:0–59" on the DVD or the CD is started (step N17). Then, the reproduction is completed (step N18) whereby this processing ends. If time search is performed again during the reproduction, the processing from step N1 is executed.

As described above, even in the time search mode in which figures to be inputted are related to one other, inputting of a non-searchable figure is prohibited. For example, in a case where time search for a title with 1:23:45 is performed, only "0" or "1" can be inputted in the "hour" digit. If "0" is inputted, "0 to 59" can be inputted in the "minute" and "second" digits. However, if "1" is inputted, "0 to 23" can be inputted in the "minute" digit. Further, if "23" is inputted as "minute", up to "45" can be inputted in the "second" digit. Performing such processing improves operability of figure key input and also leads to prevention of erroneous operation and the like in the time search mode.

What is claimed is:

1. An optical disc apparatus which has at least one of title search, chapter search, and track search modes, and which performs reproduction, or reproduction and recording of information recorded on an optical disc, wherein the optical disc apparatus comprises a system controller which:

when the optical disc apparatus is set at any of the modes, detects from the optical disc, as a maximum figure for search, a quantity number of recorded titles in a case of the title search mode, a quantity number of recorded chapters in a case of the chapter search mode, and a quantity number of recorded tracks in a case of the track search mode, and also calculates a quantity number of digits in the maximum figure for search;

if the quantity number of digits in the maximum figure for search is two and a figure inputted for search to specify an ordinal quantity number of title, chapter, or track to be searched is smaller than a figure included in a ten's digit of the maximum figure for search, registers the figure inputted for search as a figure in a ten's digit, and also registers a figure subsequently inputted for search as a figure in an one's digit;

if the quantity number of digits in the maximum figure for search is two and the figure inputted for search is equal to the figure included in the ten's digit of the maximum figure for search, registers the figure inputted for search as the figure in the ten's digit, and if the figure subsequently inputted for search is equal to or smaller than a figure included in an one's digit of the maximum figure for search, registers the figure inputted for search as the figure in the one's digit;

if the quantity number of digits in the maximum figure for search is two and the figure inputted for search exceeds the figure included in the ten's digit of the maximum figure for search, registers the figure inputted for search as the figure in the one's digit;

if the quantity number of digits in the maximum figure for search is one and the figure inputted for search is equal to or smaller than the figure included in the one's digit of the maximum figure for search, registers the figure inputted for search as the figure in the one's digit; and causes the title search, the chapter search, or the track search to be performed based on the registered figure for search.

2. The optical disc apparatus according to claim 1, wherein, if the quantity number of digits in the maximum figure for search is two and the figure inputted for search is equal to the figure included in the ten's digit of the maximum figure for search, the figure inputted for search is registered as the figure in the ten's digit, and then if the figure subsequently inputted for search exceeds the figure included in the one's digit of the maximum figure for search, the input is ignored.

3. The optical disc apparatus according to claim 1, wherein, if the quantity number of digits in the maximum figure for search is one and the figure inputted for search exceeds the figure included in the one's digit of the maximum figure for search, the input is ignored.

4. The optical disc apparatus according to claim 2, wherein, if the quantity number of digits in the maximum figure for search is one and the figure inputted for search exceeds the figure included in the one's digit of the maximum figure for search, the input is ignored.

5. The optical disc apparatus according to claim 1, further comprising a time search mode,
wherein the system controller:
when the time search mode is set, detects from the optical disc a maximum time for time search;
if a figure inputted in an hour digit for time search is equal to a figure included in an hour digit of the maximum time for time search, registers the figure inputted for time search as a figure in hour digit for search, then registers a figure inputted in a minute digit for time search, input of which figure up to a figure in a minute digit of the maximum time for time search is permitted, as a figure in a minute digit for search, and then registers a figure inputted in a second digit for time search, input of which figure up to a figure in a second digit of the maximum time for time search is permitted, as a figure in a second digit for search;
if the figure inputted in the hour digit for time search is smaller than the figure included in the hour digit of the maximum time for time search, registers figures inputted in a minute and a second digit for time search, input of which figures within a range from 0 to 59 is permitted, as figures in a minute and a second digit for search; and
causes the time search to be performed based on the figures registered for time search.

6. An optical disc apparatus which has at least one of title search, chapter search, and track search modes, and which performs reproduction, or reproduction and recording of information recorded on an optical disc,
wherein the optical disc apparatus comprises a system controller that includes:
search mode setting means for setting the optical apparatus at any of the modes;
maximum quantity number of digits detection and determination means for detecting from the optical disc, as a maximum figure for search, a quantity number of recorded titles in a case of the title search mode, a quantity number of recorded chapters in a case of the chapter search mode, and a quantity number of recorded tracks in a case of the track search mode, and also detecting and determining a quantity number of digits in the maximum figure for search;

maximum figure determination means for comparing for determination a figure inputted for search with a figure included in a ten's digit of the maximum figure for search;
highest-order digit figure registration means for, if the figure inputted for search is smaller than the figure included in the ten's digit of the maximum figure for search, registering the figure inputted for search as a figure in a ten's digit;
lower-order digit figure registration means for, if the figure inputted for search exceeds the figure included in the ten's digit of the maximum figure for search, registering the figure inputted for search as a figure in a one's digit, if the figure inputted for search is smaller than the figure included in the ten's digit of the maximum figure for search, registering a figure subsequently inputted in an one's digit for search as the figure in the one's digit for search, if the figure inputted for search is equal to the figure included in the ten's digit of the maximum figure for search and if the figure subsequently inputted in the one's digit for search is equal to or smaller than a figure included in an one's digit of the maximum figure for search, registering the figure subsequently inputted in the one's digit for search as the figure in the one's digit for search; and
input invalidating means for, if the figure inputted for search is equal to the figure included in the ten's digit of the maximum figure for search and if the figure subsequently inputted in the one's digit for search exceeds the figure included in the one's digit of the maximum figure for search, invalidating the figure subsequently inputted for search, and
wherein the system controller causes the title search, the chapter search, or the track search to be performed based on the registered figures for search.

7. An optical disc apparatus which comprises a time search mode and which performs reproduction, or reproduction and recording of information recorded on an optical disc,
wherein the optical disc apparatus comprises a system controller which:
when the time search mode is set, detects from the optical disc a maximum time for time search;
if a figure inputted in an hour digit for time search is equal to a figure included in an hour digit of the maximum time for time search, registers the figure inputted for time search as a figure in hour digit for search, then registers a figure inputted in a minute digit for time search, input of which figure up to a figure in a minute digit of the maximum time for time search is permitted, as a figure in a minute digit for search, and then registers a figure inputted in a second digit for time search, input of which figure up to a figure in a second digit of the maximum time for time search is permitted, as a figure in a second digit for search;
if the figure inputted in the hour digit for time search is smaller than the figure included in the hour digit of the maximum time for time search, registers figures inputted in a minute and a second digit for time search, input of which figures within a range from 0 to 59 is permitted, as figures in a minute and a second digit for search; and
causes the time search to be performed based on the figures registered for time search.

8. The optical disc apparatus according to claim 7,
wherein the system controller comprises:
search mode setting means for setting the time search mode;

search maximum time detection means for detecting the maximum time for time search;

maximum or smaller figure determination means for determining whether the figure inputted in the hour digit for time search is equal to or smaller than the figure included in the hour digit of the maximum time for time search;

hour digit figure registration means for, if it is determined by the maximum or smaller figure determination means that the figure inputted in the hour digit for time search is equal to the figure included in the hour digit of the maximum time for time search, registering the figure inputted for time search as the figure in the hour digit for search;

minute figure input permitting means for, if the figure inputted for time search is registered as the figure in the hour digit for search by the hour digit figure registration means, permitting a figure up to the maximum figure included in the minute digit of the maximum time for time search to be inputted as the figure subsequently inputted in the minute digit for search;

second figure input permitting means for, if the figure for time search is registered as the figure inputted in the minute digit for search, permitting a figure up to the maximum figure included in the second digit of the maximum time for time search to be inputted as the figure subsequently inputted in the second digit for search;

minute and second figure input permitting means for, if it is determined by the maximum or smaller figure determination means that the figure inputted in the hour digit for time search is smaller than the figure included in the hour digit of the maximum time for time search, permitting figures within a range from 0 to 59 to be inputted as the figures subsequently inputted in the minute and second digits for time search;

minute digit figure registration means for registering the figure inputted in the minute digit within the input ranges permitted by the minute figure input permitting means and the minute and second figure input permitting means; and second digit figure registration means for registering the figure inputted in the second digit within the input ranges permitted by the second figure input permitting means and the minute and second figure input permitting means.

\* \* \* \* \*